United States Patent
Tian et al.

(10) Patent No.: US 9,958,761 B2
(45) Date of Patent: May 1, 2018

(54) LASER SPECKLE-REMOVING OPTICAL COMPONENT, LASER SOURCE AND LASER PROJECTION EQUIPMENT

(71) Applicants: HISENSE CO., LTD., Qingdao (CN); HISENSE USA CORPORATION, Suwanee, GA (US); HISENSE INTERNATIONAL CO., LTD., Qingdao (CN)

(72) Inventors: Youliang Tian, Qingdao (CN); Xianrong Liu, Qingdao (CN); Qiang Wang, Qingdao (CN)

(73) Assignees: HISENSE CO., LTD., Shandong (CN); HISENSE USA CORPORATIONGA (US); HISENSE INTERNATIONAL CO., LTD., Shandong (CN)

( * ) Notice: Subject to any disclaimer, the term of this patent is extended or adjusted under 35 U.S.C. 154(b) by 0 days. days.

(21) Appl. No.: 15/294,561

(22) Filed: Oct. 14, 2016

(65) Prior Publication Data

US 2017/0115500 A1  Apr. 27, 2017

(30) Foreign Application Priority Data

Oct. 22, 2015  (CN) .......................... 2015 1 0683542

(51) Int. Cl.
*G03B 21/20* (2006.01)
*G02B 5/02* (2006.01)
(Continued)

(52) U.S. Cl.
CPC ......... *G03B 21/204* (2013.01); *G02B 5/0278* (2013.01); *G02B 26/008* (2013.01);
(Continued)

(58) Field of Classification Search
CPC .. G03B 21/208; G03B 21/204; G02B 26/008; G02B 27/0955; G02B 27/141;
(Continued)

(56) References Cited

U.S. PATENT DOCUMENTS

| | | | |
|---|---|---|---|
| 8,157,398 B2 * | 4/2012 | Yamamoto | G03B 21/204 353/38 |
| 2006/0109553 A1 * | 5/2006 | Serafimovich | G02B 27/46 359/565 |
| 2008/0079904 A1 * | 4/2008 | Bartlett | G03B 21/005 353/31 |
| 2012/0256101 A1 * | 10/2012 | Ye | G01N 21/6458 250/459.1 |

(Continued)

FOREIGN PATENT DOCUMENTS

CN  101855902 A  10/2010
CN  103062672 A  4/2013
(Continued)

*Primary Examiner* — Sultan Chowdhury
*Assistant Examiner* — Magda Cruz
(74) *Attorney, Agent, or Firm* — J.C. Patents (57) ABSTRACT

This disclosure provides a laser speckle-removing optical component, including a beam-shrinking lens group and a diffusion sheet arranged on a laser emergent optical path, where the beam-shrinking lens group includes a first beam-shrinking lens and a second beam-shrinking lens, and the diffusion sheet is located between the first beam-shrinking lens and the second beam-shrinking lens. The arrangement of the diffusion sheet between the first beam-shrinking lens and the second beam-shrinking lens, increases the area of speckles received by the diffusion sheet component, reduces energy density of the light received, and is able to alleviate the accumulation phenomenon of dust particles on the diffusion sheet, therefore, alleviating light attenuation phenomenon, and prolonging the service life of the laser source. This disclosure also provides a double-color laser source, a three-color laser source and a laser projection equipment applying the above laser speckle-removing optical component.

8 Claims, 8 Drawing Sheets

(51) Int. Cl.
*G02B 26/00* (2006.01)
*G02B 27/09* (2006.01)
*G02B 27/14* (2006.01)
*G02B 27/48* (2006.01)
*H04N 9/31* (2006.01)

(52) U.S. Cl.
CPC ....... *G02B 27/0955* (2013.01); *G02B 27/141* (2013.01); *G02B 27/48* (2013.01); *G03B 21/208* (2013.01); *H04N 9/3114* (2013.01); *H04N 9/3158* (2013.01); *H04N 9/3161* (2013.01); *H04N 9/3164* (2013.01)

(58) Field of Classification Search
CPC .... G02B 27/48; G02B 5/0278; H04N 9/3114; H04N 9/3161
See application file for complete search history.

(56) References Cited

U.S. PATENT DOCUMENTS

| | | | |
|---|---|---|---|
| 2013/0088471 A1* | 4/2013 | Kitano | H04N 9/3114 345/208 |
| 2014/0293232 A1* | 10/2014 | Tanaka | G03B 21/204 353/20 |
| 2015/0049456 A1* | 2/2015 | Hoehmann | H04N 9/3158 362/84 |
| 2015/0124430 A1* | 5/2015 | Mehl | G02B 26/008 362/84 |
| 2016/0109789 A1* | 4/2016 | Zhao | G03B 33/08 362/84 |

FOREIGN PATENT DOCUMENTS

| | | |
|---|---|---|
| CN | 203786412 U | 8/2014 |
| CN | 104914659 A | 9/2015 |

* cited by examiner

LASER SPECKLE-REMOVING OPTICAL COMPONENT, LASER SOURCE AND LASER PROJECTION EQUIPMENT

CROSS REFERENCE TO RELATED APPLICATIONS

This application claims priority of Chinese patent application No. 201510683542.8, filed on Oct. 22, 2015, and entitled "LASER SPECKLE-REMOVING OPTICAL COMPONENT, AND DOUBLE-COLOR AND THREE-COLOR LASER SOURCE", which is hereby incorporated by reference in its entirety.

TECHNICAL FIELD

This disclosure relates to the laser display field, particularly to a laser speckle-removing optical component, a double-color laser source, a three-color laser source and a laser projection equipment.

BACKGROUND

Laser, as a light source with high brightness and strong directivity, can emit a monochromatic coherent beam. And its various merits have given rise to an ever increasing utilization of laser as a light source in the field of projection display technologies in recent years. At present, however, the laser source is confronted with at least the following challenges in application:

One is high coherence of laser, which inevitably leads to a speckle effect. The so-called speckle refers to the phenomenon that, when a coherent light source irradiates on objects with rough surfaces, the light is scattered; with the same wavelength and a constant phase, the scattered light will generate interference in space, with constructive interference occurring at some positions and destructive interference occurring at some other positions in space, creating an overall effect of dark and bright granular speckles on a screen. Long-time watching at these unfocused flashing speckles will subject an observer to a sense of vertigo, and the projected image will also suffer a decline in quality, thus degrading the user's viewing experience, therefore a speckle-removing optical path is required to be designed for performing decoherence of laser beams to improve projection display effect of laser.

The second problem is that, in a laser propagation optical path, the cross-section area of an optical lens is typically much smaller than the area of laser speckles emitted by a laser device group (the diameter of the speckles generated by a laser device can be as large as roughly 60 mm, but the diameter of an ordinary optical lens is relatively small, for example, may be 30 mm or so, and the functioning area is even smaller, given that only a central part of an optical lens serves as a main region for processing light, due to factors such as processing, installation processes), therefore, laser beams generated by the laser device need to undergo a beam-shrinking process to form smaller speckles, only by which the transmittance rate and light processing efficiency of the beams can be enhanced when the beams pass through the optical lens. This is particularly true in the case of a hybrid laser source which is composed of laser and fluorescence, where fluorescent powder on a fluorescent wheel demands high-energy laser speckles to be excited, thus the diameter of laser speckles irradiating on the surface of the fluorescent wheel is about 0.8 mm, smaller than one-hundredth of the area of the laser speckles generated by the laser device, hence subjecting the laser speckles to the beam-shrinking process during laser propagation is highly necessary.

According to a laser speckle-removing optical component, laser beams emitted by a laser device firstly pass through a beam-shrinking component, which can be a lens or a lens group with light converging effect, then pass through a speckle-removing component arranged behind the beam-shrinking component, such as a diffusion sheet or a diffusion plate, for being successively processed by beam-shrinking and speckle-removing of laser, and then the laser beams are incident to a subsequent optical lens.

However, the technical personnel finds in application that, in the above laser speckle-removing optical component, transmittance of laser is reduced due to a large amount of dust particles collected by the diffusion sheet component, which not only deteriorates the speckle-removing effect, but also leads to a light attenuation phenomenon during laser propagation, great reduction in the brightness of the laser projection display image, shortened service life of a laser illumination light source. Therefore, what is said above poses a technical problem to be solved urgently in the application of laser source.

SUMMARY

This disclosure is realized via the following technical solutions:

A laser speckle-removing optical component, including a beam-shrinking lens group and a diffusion sheet arranged in a laser emergent optical path, where the beam-shrinking lens group includes a first beam-shrinking lens and a second beam-shrinking lens, and the diffusion sheet is located between the first beam-shrinking lens and the second beam-shrinking lens.

Moreover, this disclosure also provides a double-color laser source, including at least a red laser device and a blue laser device, respectively emitting red laser and blue laser, where the double-color laser source is provided with a beam-shrinking lens group and a diffusion sheet on at least one emergent optical path of an emergent optical path of red laser and an emergent optical path of the blue laser, where the beam-shrinking lens group includes a first beam-shrinking lens and a second beam-shrinking lens, and the diffusion sheet is located between the first beam-shrinking lens and the second beam-shrinking lens.

In addition, this disclosure also provides a three-color laser source, including a red laser device, a blue laser device and a green laser device, where laser respectively emitted by the red laser device, the blue laser device and the green laser device is converged and passes through a laser speckle-removing optical component as described above.

Furthermore, this disclosure also provides a laser projection equipment, including a display component, an optical module, a control component and a double-color laser source as described above; where the optical module includes a first optical component for guiding light from the double-color laser source towards the display component, and a second optical component for projecting light emitted by the display component to a screen; and the control component is configured to control the display component and the double-color laser source.

Moreover, this disclosure also provides a laser projection equipment, including a display component, an optical module, a control component and a three-color laser source as described above; where the optical module includes a first optical component for guiding light from the three-color laser source towards the display component, and a second optical component for projecting light emitted by the display component to a screen; and the control component is configured to control the display component and the three-color laser source.

DESCRIPTION OF EMBODIMENTS

In order to make a clearer description of the purpose, technical solutions and merits of this disclosure, this disclosure will be described below in further detail in conjunction with the accompanying drawings. Obviously, the described embodiments are just part rather than all of the embodiments of this disclosure. Based on the embodiments of this disclosure, all the other embodiments, achieved by those skilled in the art without creative efforts, shall belong to the protection scope of this disclosure.

Figure 1:
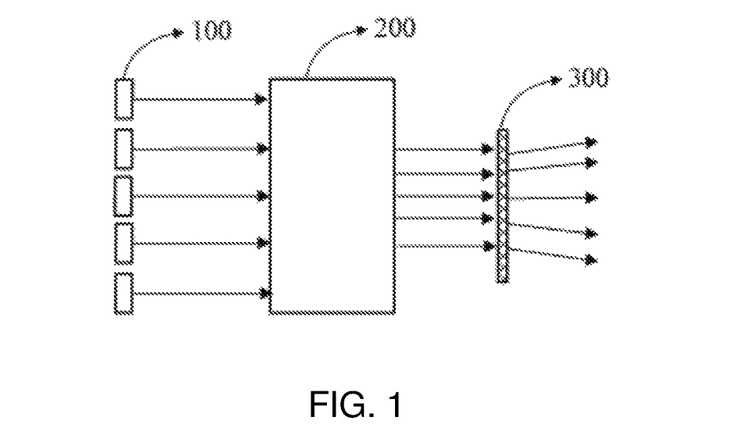
FIG. 1 is a schematic diagram of a laser speckle-removing optical component.

FIG. 1 illustrates a laser speckle-removing optical component. As shown in FIG. 1, laser beams emitted by a laser device 100 firstly pass through a beam-shrinking component 200, which may be a lens or a lenses group capable of converging light, then pass through a speckle-removing component 300 arranged in the rear of the beam-shrinking component 200 (which refers to the opposite side of the laser incident side), which may, for instance, be a diffusion sheet or a diffusion plate, sequentially undergoing laser beam-shrinking and speckle-removing, and are finally incident to an optical lens in the rear.

Figure 2:
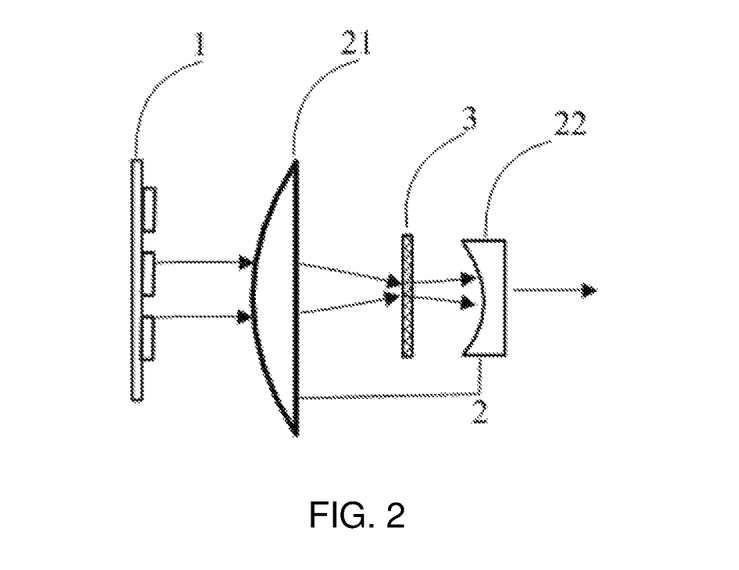
FIG. 2 is a schematic diagram of a laser speckle-removing optical component provided by an embodiment of this disclosure.

An embodiment of this disclosure also provides a laser speckle-removing optical component, as shown in FIG. 2, for receiving emergent laser emitted by a front laser device or laser device array 1, where the emergent laser passes through a beam-shrinking lens group 2 composed of a first beam-shrinking lens 21 and a second beam-shrinking lens 22 in sequence for beam-shrinking, so as to reduce the area of laser speckles. Furthermore, the emergent laser also passes through a diffusion sheet 3 arranged between the first beam-shrinking lens 21 and the second beam-shrinking lens 22, for diffusing the laser beams and generating more spatial random phases, thereby playing the role of removing speckles. And preferably, the diffusion sheet is capable of rotating or translating under control, as the diffusion sheet in motion delivers a better speckle-removing effect than a fixedly arranged diffusion sheet.

In specific implementations, as shown in FIG. 2, the first beam-shrinking lens 21 usually adopts one large convex lens, for receiving all laser beams emitted by the laser device. As mentioned above, the area of laser beams emitted by the laser device can reach as much as about 60 mm, which requires collecting speckles within the area range for convergence, and conducts preliminary beam-shrinking or speckle reduction process.

The second beam-shrinking lens 22 may be one concave lens, the focus point of which is coincident with that of the first beam-shrinking lens, i.e. the convex lens, allowing the two lenses to form a telescope system.

The laser beams firstly pass through the first beam-shrinking lens (the convex lens) to undergo rapid convergence, and then pass through the second beam-shrinking lens (the concave lens) to be diverged to form parallel beams, the speckle diameter of which is already smaller than that of beams emitted by the laser device, fulfilling the purpose of beam-shrinking, while allowing the light to propagate in straight lines, thus facilitating boosting light processing efficiency for subsequent optical lenses, and reducing optical loss caused by light angle being not parallel with the optical axis.

Figure 3:
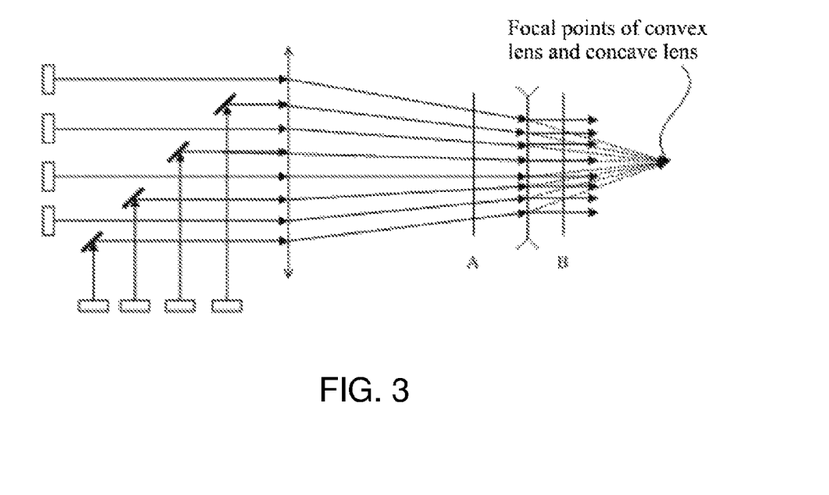
FIG. 3 is a schematic diagram illustrating a laser beam-shrinking principle provided by an embodiment of this disclosure.

During the beam-shrinking process of the laser beams, the diffusion sheet 3 also has a diffusion function, as the diffusion sheet is able to diffuse the light, enabling to increase random phases of laser in space, as mentioned above, so as to disrupt the phases or avoid generation of constant phase differences, which is essential for interference to occur, thus reducing coherence degree of laser, and removing the speckles. A diagram illustrating the beam-shrinking principle of a telescope system is shown in FIG. 3, in which the convex lens functions to converge the incident laser beams, which form parallel emergent beams after diffused by the concave lens. It may be considered that, the area of the beams emergent from the concave lens is equivalent to that of the beams received by the concave lens. In comparison with the cross-section area of the beams at position A, the cross-section area of the beams at position B is smaller, thus, according to an embodiment of this disclosure, the diffusion sheet 3 is located in the front rather than in the rear of the second beam-shrinking lens, resulting in an increase in the area of the received laser speckles.

Compared with the case where the diffusion sheet is located in the rear of the second beam-shrinking lens, the arrangement of the diffusion sheet between the first beam-shrinking lens and the second beam-shrinking lens allows the diffusion sheet to receive speckles with similar shapes at both the positions but an increased area. The technical personnel find in practice that, the diffusion sheet 3 is subject to larger optical energy density when smaller speckles pass through the diffusion sheet 3, and collects a large amount of dust particles thereon over time, since fine dust particles tend to accumulate where the optical energy is intensive. And the blocking of the dust particles induces a decline in transmittance of laser, degrading the speckle-removing effect, and even more, reducing emergent brightness of laser as an illumination light source in the meantime, creating a light attenuation phenomenon during propagation of laser beams, thus reducing the brightness of images projected on a projection screen, and significantly shortening the service life of the laser source and the laser projection equipment.

When the area of laser speckles received by the diffusion sheet 3 becomes larger than the original size, the optical energy density of the speckles experiences a decline since the laser beams maintain a substantially stable total energy, allowing to alleviate the accumulation phenomenon of dust particles on the diffusion sheet, so as to ease the problem of light attenuation, improve the stability in projection display brightness of laser, and prolong the service life of the laser source.

Instead of requiring additional dustproof or dust-removing components, or increasing the design cost of an optical architecture system, the technical solutions provided by embodiments of this disclosure, by merely altering the position of the speckle-removing component, i.e., the diffusion sheet, relative to that of the beam-shrinking lens group, reduce the optical energy density received by the diffusion sheet, and manage to remove laser speckles and alleviate the light attenuation phenomenon during propagation of laser beams.

Figure 4:
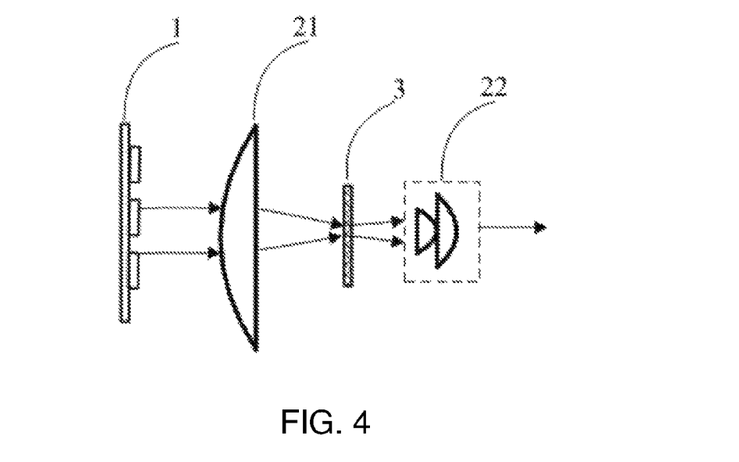
FIG. 4 is a schematic diagram of a laser speckle-removing optical component provided by another embodiment of this disclosure.

According to an embodiment of this disclosure, the second beam-shrinking lens is one convex lens or a convex lenses group composed of two convex lenses, in which the one convex lens or the convex lenses group composed of two convex lenses is arranged opposite to the first beam-shrinking lens. As shown in FIG. 4, a convex lenses group 22 is located in the rear of the diffusion sheet 3, and is arranged opposite to the first beam-shrinking lens, i.e., the convex lens.

Since the light is diverged after the laser beams pass through the diffusion sheet 3, the first convex lens of the convex lenses group 22 is able to collimate the diverged laser beams, the second convex lens is able to converge the collimated parallel beams again, allowing to increase the beam-shrinking degree, and to satisfy the irradiation requirements of small speckles.

The aforementioned convex lenses group may also be substituted by one convex lens, both of which are capable of converging light and reducing the area of speckles.

Likewise, in this embodiment, the arrangement of the diffusion sheet between the first beam-shrinking lens, i.e., the convex lens 21 and the second beam-shrinking lens, i.e., the convex lenses group 22, enables the area of laser speckles received by the diffusion sheet 3 to become large, and the optical energy density to be smaller, thus realizing speckle-removal while alleviating accumulation phenomenon of dust or particles on the diffusion sheet at the same time, and managing to remove laser speckles and alleviate the light attenuation phenomenon during propagation of the laser beams.

Figure 5:
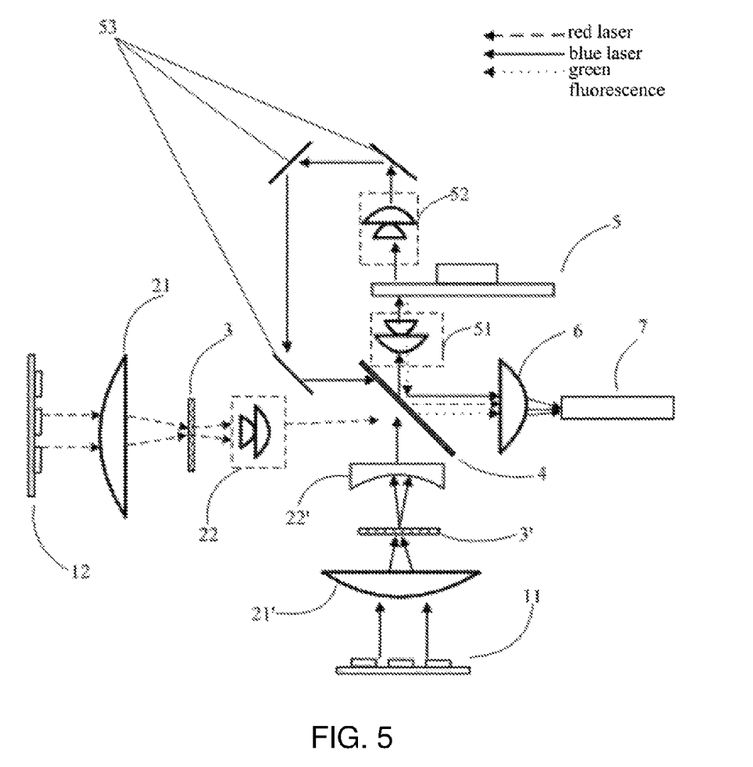
FIG. 5 is a schematic diagram illustrating an optical architecture of a double-color laser source provided by an embodiment of this disclosure.

An embodiment of this disclosure also provides a double-color laser source, as shown in FIG. 5, including a blue laser device 11 and a red laser device 12, respectively emitting blue laser and red laser. The emergent optical path of red laser is provided with a laser speckle-removing optical component, in which a second beam-shrinking lens is a convex lens or a convex lenses group, as described by the above embodiment; and the emergent optical path of blue laser is provided with a laser speckle-removing optical component, in which a second beam-shrinking lens is a concave lens, as described by the above embodiment, for both cases merely one specific example, which is not intended for limitation, is provided in the embodiments of this disclosure. Optionally, the emergent optical path of red laser may also be provided with a laser speckle-removing optical component, in which a second beam-shrinking lens is concave lens, as described by the above embodiment; and the emergent optical path of blue laser may also be provided with a laser speckle-removing optical component, in which a second beam-shrinking lens is a convex lens or a convex lenses group, as described by the above embodiment. And due to the fact that human eyes are more sensitive to the speckle effect of red laser, a laser speckle-removing optical component, as described by the above embodiment, may also be arranged only on the emergent optical path of red laser.

Specifically, as shown in FIG. 5, a convex lens 21 serving as the first beam-shrinking lens, a diffusion sheet 3, and a convex lenses group 22 serving as the second beam-shrinking lens are successively arranged on the emergent light path of the red laser device 12, in which the convex lens 21 and the convex lenses group 22 jointly form a beam-shrinking lens group, the specific operation process thereof is similar to that of the above embodiments, and will not be repeated herein.

A convex lens 21' serving as the first beam-shrinking lens, a diffusion sheet 3', and a concave lens 22' serving as the second beam-shrinking lens are successively arranged on the emergent light path of the blue laser device 11, in which the convex lens 21' and the concave lens 22' jointly form a beam-shrinking lens group, the specific operation process thereof is similar to that of the above embodiments, and will not be repeated herein.

It should be noted that, since human eyes are more sensitive to the speckle effect of red laser than to the speckle effect of blue laser, the diffusion degree of the beams caused by the diffusion sheet 3 on the emergent optical path of red laser is larger than that of the beams caused by the diffusion sheet 3' on the optical path of blue laser, which is to say, beams with the same incident angle are diverged at a larger degree through the diffusion sheet 3 than through the diffusion sheet 3'. In the specific implementation, the diffusion sheet 3' may adopt a diffusion sheet made of ordinary materials, and the diffusion sheet 3 may be prepared by coating diffuse reflection particles on a diffusion sheet made of ordinary materials, such as a binary element or frosted glass, so as to achieve stronger diverging effect; alternatively, semiconductor lithography process is employed to form micro structures with different granularities, sizes, and arrangements on the surface of the diffusion sheet material, thus allowing to diverge the beams. The diffusion sheet may be of a scattering type or a diffraction type, to which there will be no specific restrictions herein.

Due to the fact that red laser requires to be diffused to a greater extent, and to be subject to a beam-shrinking shaping process, preferably, the second beam-shrinking lens adopts a convex lens group composed of two convex lenses, and the two lenses in the convex lens group are both arranged opposite to the convex lens 21. The first convex lens in the two convex lenses may be an aspheric lens, allowing stronger convergence of the diverged light, so as to form parallel beams, and the second convex lens may be a spherical lens, allowing another convergence of the parallel beams, so as to reduce the area of the beams or the speckles. As a result, the convergence of the beams are accelerated due to collection functions of the two convex lenses, thus the requirement for beam-shrinking is met.

Regarding the emergent optical path of blue laser, the light is required to irradiate on a fluorescent wheel to conduct fluorescence excitation after passing through the above speckle-removing optical component.

Figure 6:
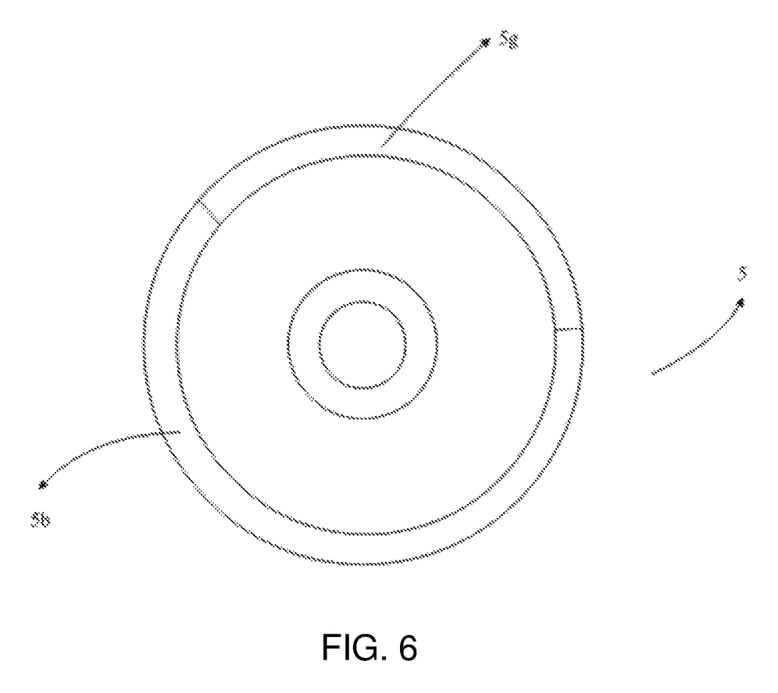
FIG. 6 is a schematic diagram illustrating planar distribution of a fluorescent wheel provided by an embodiment of this disclosure.

In this embodiment, the double-color laser source also includes a fluorescent wheel 5. As shown in FIG. 6, the fluorescent wheel 5 includes a fluorescent region 5g and a transmission region 5b, in which the fluorescent region 5g is coated with green fluorescence powder to be excited by blue laser to emit green fluorescence, and the transmission region 5b is used to transmit part of blue laser, and the fluorescent region 5g and the transmission region 5b are sequentially located on the emergent optical path of blue laser upon time sequence according to rotation of the fluorescent wheel. The excited green fluorescence is reflected by a smooth mirror surface of an aluminum substrate of the fluorescent wheel 5, and is emergent in a direction opposite to the incident direction of blue laser along the front side of the fluorescent wheel 5 (i.e., the laser incident side). The blue laser transmitted through the fluorescent wheel 5 returns to the front side of the fluorescent wheel 5 through an relay circuit on the back of the fluorescent wheel (i.e., the opposite side of the laser incident side), where a collimation lens group 52 and a relay lens group 53 form the relay circuit. In addition, because fluorescence excitation requires laser speckles with high energy density, the blue laser, after passing through the speckle-removing optical component (including beam-shrinking shaping), further passes through a collimation lens group 51 arranged on the front side of the fluorescent wheel 5, which may perform further convergence to the blue laser beams, thereby forming speckles with predetermined diameter as required to irradiate on the fluorescent powder. Meanwhile, blue laser emergent from the back side of the fluorescent wheel 5 is diverged, which needs to pass through the collimation lens group 52 to be collimated to form parallel or approximately parallel beams, and pass through a reflector and a relay lens to undergo directional conversion of optical axis, and finally return to the front side of the fluorescent wheel.

Red laser passing through the speckle-removing optical component also arrives at a position in front of the front side of the fluorescent wheel 5, to be converged with blue laser and green fluorescence. Specifically, a light-converging component 4, which may be a dichroscope, is arranged in front of the front side of the fluorescent wheel 5, and is plated with a film capable of transmitting blue and red light while reflecting green light to realize the transmission of red laser and blue laser, reflection of green fluorescence, as well as emergence of the three light in the same direction, so as to fulfill the purpose of outputting the hybrid three-color light.

When applied as an illumination light source, the laser source, after being converged and outputted by the dichroscope 4, will output the three-color light successively into a light collection component 7 at the back end, such as a light stick, according to the order in which the red laser device and the blue laser device are lit up, and then into an optical engine component (not shown in the drawings). Since the light stick has a certain incident angle range, for example, roughly plus or minus 25 degrees, the light with the three primary colors needs to pass through a focusing lens 6 to be focused again, i.e., to be converged, so as to fall within the incident angle range of the light stick 7 to enter the light stick.

Concerning the double-color laser source provided by the embodiments of this disclosure, the diffusion sheet is arranged between the first beam-shrinking lens and the second beam-shrinking lens on speckle-removing optical components of red laser and blue laser, respectively, which increases the area of speckles received by the diffusion sheet component, when compared with the case in which the diffusion sheet is arranged in the rear of the second beam-shrinking lens. As a result, the solution reduces energy density of the light received, and is able to alleviate the accumulation phenomenon of dust particles on the diffusion sheet, therefore, manages to remove laser speckles while alleviate light attenuation phenomenon of the laser beams during propagation, allowing the service life of the double-color laser source to be prolonged due to the alleviated light attenuation phenomenon.

In the embodiments of this disclosure, the red laser device 12 and the blue laser device 11 are arranged vertically, and may also be arranged in parallel as a variation of the embodiments of this disclosure. Prior to arriving at the light-converging component, the direction of one optical path needs to undergo conversion of 90 degrees by a reflector component added on the optical path, thus allowing light on the two path to pass through a dichroscope light-converging component in directions perpendicular to each other. Such a variation will not render substantial changes in the technical solution, and has the same beneficial effect as the aforementioned embodiments.

Figure 7:
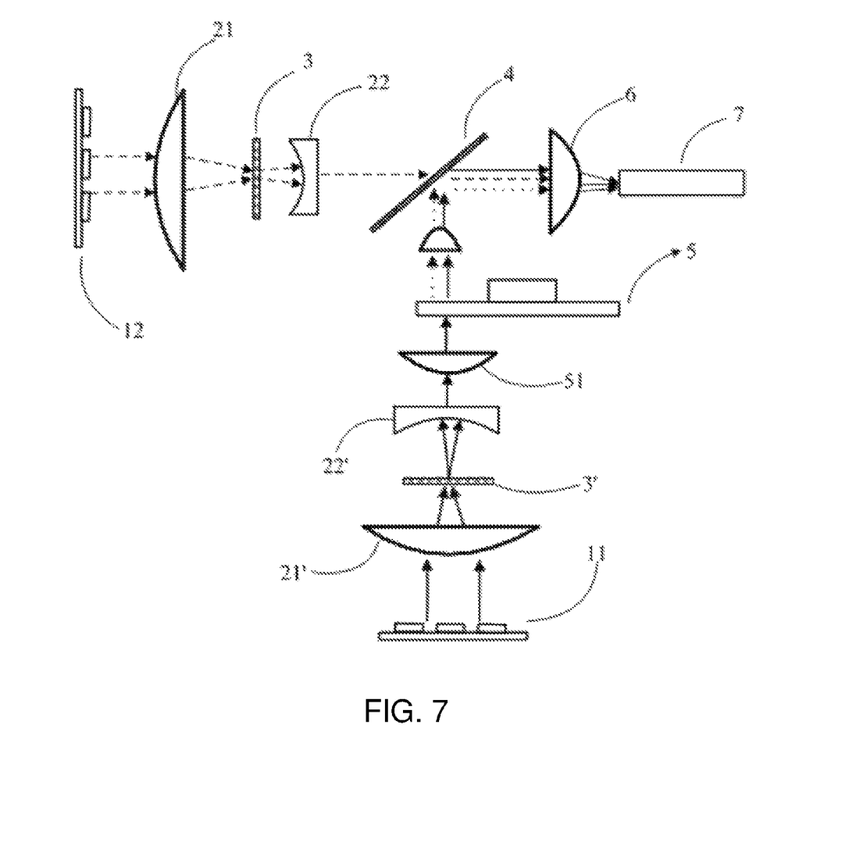
FIG. 7 is a schematic diagram illustrating an optical architecture of a double-color laser source provided by another embodiment of this disclosure.

An embodiment of this disclosure provides another double-color laser source structure. What is different from the above embodiments is that, this embodiment uses a transmission type fluorescent wheel, which likewise, can be referred to FIG. 6, including a fluorescent region and a transmission region, in which the fluorescent region is formed by curing, such as through a sintering process, mixed fluorescent powder and inorganic materials, so as to form a fluorescent powder layer with a certain thickness. The fluorescent powder layer is transparent, and transmits blue laser and reflects green fluorescence via a dichroic film arranged on the outer side of the fluorescent powder layer, i.e., the incident side of blue laser; where the fluorescence is reflected by the surface of the film and then transmits through the fluorescent powder layer; and blue laser is able to transmit through the transmission region in accordance with the time sequence of the rotation of the fluorescent wheel, so that emergence of both blue laser and green fluorescence from the back side of the fluorescent wheel can be realized through the fluorescent wheel component, as shown in FIG. 7. Compared with the reflection-type fluorescent wheel, the reflection herein refers to the situation in which fluorescence, after excitation, is reflected by a non-transparent mirror surface of the aluminum substrate of the fluorescent wheel, so as to be emergent in a direction opposite to the incident direction of blue laser. The structure of the double-color light source in the embodiment of this disclosure adopts a transmission-type fluorescent wheel structure, enabling to minimize the design of the blue laser circuit, lessen the usage of optical lenses, which is conducive to decreasing the light source structure volume of the double-color light source. In addition, optionally, the red laser optical path in this embodiment uses a laser speckle-removing optical component, in which the second beam-shrinking lens is a concave lens, as described in the aforementioned embodiments.

As to the speckle-removing optical components of red laser and blue laser, the diffusion sheet 3 and the diffusion sheet 3' are located in the middle of the telescope system; the "middle" here refers to "between", rather than strictly limiting the exact location, being intended to be distinguished from a location in the rear of the beam-shrinking lens. Similarly, the solution is able to reduce the received optical energy density by increasing the area of speckles received by the diffusion sheet component, thus allowing to alleviate accumulation phenomenon of dust particles on the diffusion sheet, which manages to remove laser speckles while alleviate the light attenuation phenomenon of laser beams during propagation at the same time.

Figure 8:
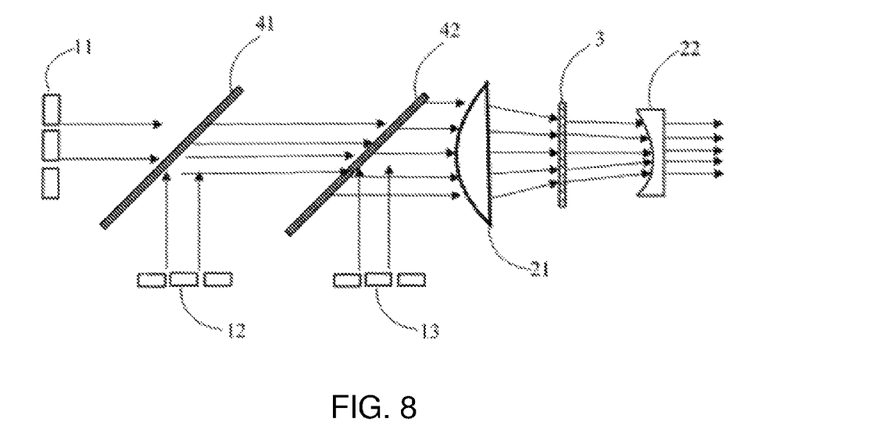
FIG. 8 is a schematic diagram illustrating an optical architecture of a three-color laser source provided by an embodiment of this disclosure.

An embodiment of this disclosure also provides a three-color laser source structure. As shown in FIG. 8, a three-color laser source includes a red laser device group 11, a blue laser device group 12 and a green laser device group 13; the arrangement positions of the above laser devices of three colors are not specifically restricted herein with the locations and orders being interchangeable.

According to one implementation, the red laser device group 11 and the blue laser device group 12 are arranged vertically, a light converging lens 41, which may be a group of reflector units with intervals, is used to conduct light convergence, where red laser directly passes through the intervals of the reflector units, and blue laser is reflected by the reflector and propagates in the same direction as the propagation direction of red laser. The light converging lens 41 may also be a dichroic film, with the selective function of transmitting red light while reflecting blue light.

The converged red laser and blue laser are converged again with green laser emitted by the green laser device group 13 in a similar way as that of how red laser and blue laser are converged, as described above, and finally laser of the three primary colors is emergent in the same direction.

The three-color laser is converged to become one light beam, and the one beam of three primary color laser undergoes speckle-removal through a laser speckle-removing optical component as described in abovementioned embodiments. FIG. 8 illustrates a laser speckle-removing optical component, in which the second beam-shrinking lens is a concave lens as described in the aforementioned embodiments, being used to conduct speckle-removal; a diffusion sheet 3 is located between a first beam-shrinking lens, i.e., a convex lens 21 and a second beam-shrinking lens, i.e., a concave lens 22; compared with the case in which the diffusion sheet is arranged in the rear of the second beam-shrinking lens, the solution of this embodiment increases the area of speckles received by the diffusion sheet component, thereby reducing the received optical energy density, which is able to alleviate accumulation phenomenon of dust particles on the diffusion sheet, thus managing to remove laser speckles while alleviate light attenuation phenomenon of laser beams during propagation at the same time, being conducive to prolong the service life of the three-color laser source, and having a high pragmatic value.

Furthermore, as a variation of this embodiment, the above laser speckle-removing optical component may be applied to each optical path or any two of the three optical paths before the three paths of laser are converged, and the operation process thereof, and the effects and purpose to be achieved by such a solution are similar to those of this embodiment, which will not be repeated herein. However, compared with the solution of this embodiment, where the three paths of laser are converged before passing through the laser speckle-removing optical component, the application of the speckle-removing optical component to a single optical path or two paths before the convergence is performed can boost the laser speckle-removing effect to some extent, but will also increase the volume and cost of the laser source.

Figure 9:
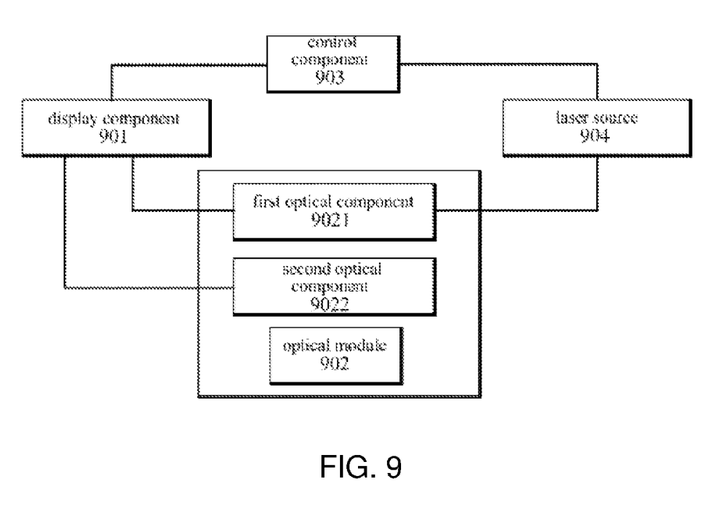
FIG. 9 is a structural block diagram of a laser projection equipment provided by an embodiment of this disclosure.

An embodiment of this disclosure also provides a laser projection equipment, as shown in FIG. 9. The laser projection equipment includes a display component 901, an optical module 902, a control component 903 and a laser source 904 as described by the above solutions, in which the optical module 902 further includes a first optical component 9021 for guiding the light from the double-color laser source 904 towards the display component 901, and a second optical component 9022 for projecting the light emitted by the display component 901 to a screen; and the control component 903 is used to control the display component 901 and the laser source 904.

In this embodiment, the laser source 904 may be a laser source as described in any of the aforementioned embodiments. According to one implementation, the laser source 904 may be a double-color laser source as described in the aforementioned embodiments. Specifically, the double-color laser source includes at least a red laser device and a blue laser device, respectively emitting red laser and blue laser, in which the double-color laser source is provided with a beam-shrinking lens group and a diffusion sheet on the emergent light path(s) of red laser and/or blue laser, where the beam-shrinking lens group includes a first beam-shrinking lens and a second beam-shrinking lens, and the diffusion sheet is located between the first beam-shrinking lens and the second beam-shrinking lens. According to another implementation, the laser source 904 may be a three-color laser source as described in the aforementioned embodiments. Specifically, the three-color laser source includes a red laser device, a blue laser device and a green laser device, where laser respectively emitted by the red laser device, the blue laser device and the green laser device is converged and then passes through the laser speckle-removing optical component as described in the aforementioned embodiments.

Figure 10:
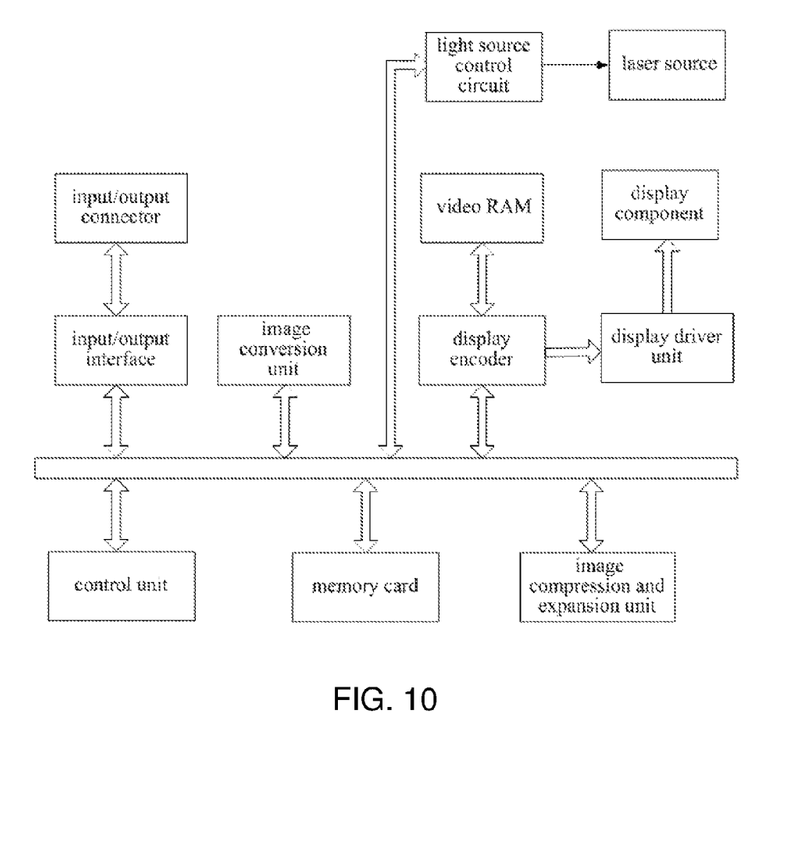
FIG. 10 is a diagram illustrating function modules of a laser projection equipment provided by an embodiment of this disclosure.

The structure and operation process of the laser projection equipment will be described in detail in conjunction with the diagram illustrating the functional modules of the laser projection equipment as shown in FIG. 10.

As shown in FIG. 10, specifically, the control component 903 of the laser projection equipment consists of a control unit, an input/output interface, an image conversion unit, a display encoder, a display driver unit and the like. Image signals of various specifications inputted from an input/output connector are converted into image signals of a specified format suitable for display by the image conversion unit via the input/output interface and a system bus, and then outputted to the display encoder. Moreover, on the basis of expanding and storing the inputted image signals on a video RAM, the display encoder generates video signals according to the contents stored on the video RAM, and outputs the video signals to the display driver unit. Corresponding to the image signals outputted from the display encoder, the display driver unit drives the display component 901 with an appropriate frame rate, and allows beams emitted by the laser source 904 to be incident to the display component 901 via the first optical component 9021 of the optical module 902, so as to form an optical image through the reflection light of the display component 901, after which the image is displayed through projection on the screen (not shown in the drawings) via a lens group of a projection system serving as the second optical component 9022.

Moreover, an image compression and expansion unit performs data compression to brightness signals and color difference signals of the image signals, and sequentially writes the signals into a memory card as a recording medium. And then, in a reproduction mode, the image compression and expansion unit reads out image data recorded on the memory card, and expands all the image data constituting a series of animation with one frame as a unit, and outputs the image data via the image conversion unit to the display encoder, and allows to display the animation and the like according to the image data stored on the memory card.

The control unit in the control component 903 is used to control actions of circuits in the laser projection equipment, including processing operations from both buttons on the panel of the housing of the laser projection equipment and buttons from a remote control, as well as processing of sound and the like. Furthermore, in the case where the laser source 904 is a double-color laser source as aforementioned, the control unit also enables a light source control circuit to conduct time division control to emit red laser, blue laser and green fluorescence by the laser source 904 in accordance with the image signals, and at the same time allows a motor control circuit to control a motor to drive the fluorescent wheel to rotate.

The laser projection equipment is further provided with an optical system unit. The optical system unit is composed of an illumination-side module located near the laser source 904, an image generation module located on the side of the back panel, and a projection-side module located between the illumination-side module and a side panel. The illumination-side module includes part of the first optical component 9021, which is involved in guiding the light emitted by the laser source 904 towards the display component 901 included in the image generation module. The first optical component 9021, which is included in the illumination-side module, is provide with a light guide device for allowing the beams emitted by the laser source 904 to become beams with evenly distributed intensity, as well as a converging lens for converging the light passing through the light guide device, and the like. The image generation module serves as the first optical component 9021, and includes: an optical axis changing mirror, used for changing the optical axis direction of the beams emitted out of the light guide device; multiple converging lenses, used for converging the light reflected by the optical axis changing mirror to the display component 901; and an irradiation mirror, used for irradiating the beams transmitting through these converging lenses onto the display component 901 at a specified angle. The projection-side module includes a lens group of the second optical component 9022 for projecting the light, which is emitted by the display component 901 and forms an image, onto a screen. The second optical component 9022 includes a fixed lens group built in a fixed lens barrel and a movable lens group built in a movable lens barrel, and is arranged as a zoomable lens with a variable focus point, where a lens motor drives the movable lens group to move, so as to conduct zooming adjustment and focusing adjustment.

The laser projection equipment provided by the embodiment of this disclosure includes the double-color or three-color laser source, and the double-color or three-color laser source further includes the laser speckle-removing optical component, in which the diffusion sheet is arranged between the first beam-shrinking lens and the second beam-shrinking lens, which increases the area of speckles received by the diffusion sheet component, compared with the case in which the diffusion sheet is arranged in the rear of the second beam-shrinking lens, thus reducing the received optical energy density, and allowing to alleviate the accumulation phenomenon of dust particles on the diffusion sheet, thereby managing to remove laser speckles and alleviate light attenuation phenomenon of the laser beams during propagation, increasing the stability in laser projection display brightness of the laser projection equipment, while prolonging the service life of the laser source and thus the laser projection equipment.

Although the preferred embodiments of this disclosure have been described, additional changes and modifications can be made to those embodiments by those skilled in the art once the basic inventive concepts are obtained. Therefore, the appended claims are intended to be construed to include the preferred embodiments and all the changes and modifications falling into the scope of this disclosure.

Apparently, various alterations and variations may be made by those skilled in the art to this disclosure without departing from the spirit and scope of this disclosure. In this way, should these modifications and variations made to this disclosure fall within the scope of the claims of this disclosure and equivalent techniques thereof, the same modifications and variations are intended to be included in this disclosure.

What is claimed is:

1. A double-color laser source, comprises at least a red laser device and a blue laser device, respectively emitting red laser and blue laser, wherein, the double-color laser source is provided with a beam-shrinking lens group and a diffusion sheet on at least one emergent optical path of an emergent optical path of the red laser and an emergent optical path of the blue laser, wherein the beam-shrinking lens group comprises a first beam-shrinking lens and a second beam-shrinking lens, and the diffusion sheet is located between the first beam-shrinking lens and the second beam-shrinking lens;

wherein, a fluorescent wheel is further arranged in the rear of the second beam-shrinking lens on the emergent optical path of the blue laser, and the fluorescent wheel is coated with green fluorescence powder, for emitting green fluorescence under excitation by the blue laser.

2. The double-color laser source according to claim 1, wherein, the fluorescent wheel is provided with a non-transparent substrate on an opposite side of a laser incident side, and a light-converging component is further arranged in front of the laser incident side of the fluorescent wheel, for converging the red laser, green fluorescence reflected by the non-transparent substrate of the fluorescent wheel, and blue laser which is transmitted through the fluorescent wheel and returns.

3. The double-color laser source according to claim 2, wherein, the light-converging component is a dichroscope, which is plated with a film capable of transmitting blue and red light while reflecting green light.

4. The double-color laser source according to claim 1, wherein, a dichroic film is arranged on a surface of a laser incident side of the fluorescent wheel, for transmitting blue laser and reflecting green fluorescence, and a light-converging component is further arranged in front of an opposite side of the laser incident side of the fluorescent wheel, for converging the red laser, green fluorescence transmitted through the fluorescent wheel, and blue laser transmitted through the fluorescent wheel.

5. The double-color laser source according to claim 4, wherein, the light-converging component is a dichroscope, which is plated with a film capable of transmitting red light while reflecting blue and green light.

6. The double-color laser source according to claim 1, wherein, the diffusion sheet is capable of rotating under control.

7. The double-color laser source according to claim 1, wherein, the diffusion sheet is capable of translating under control.

8. A laser projection equipment, comprising a display component, an optical module, a control component and a double-color laser source according to claim 1, wherein, the optical module comprises a first optical component for guiding light from the double-color laser source towards the display component, and a second optical component for projecting light emergent from the display component to a screen, and the control component is configured to control the display component and the double-color laser source.

* * * * *